Figure 1:
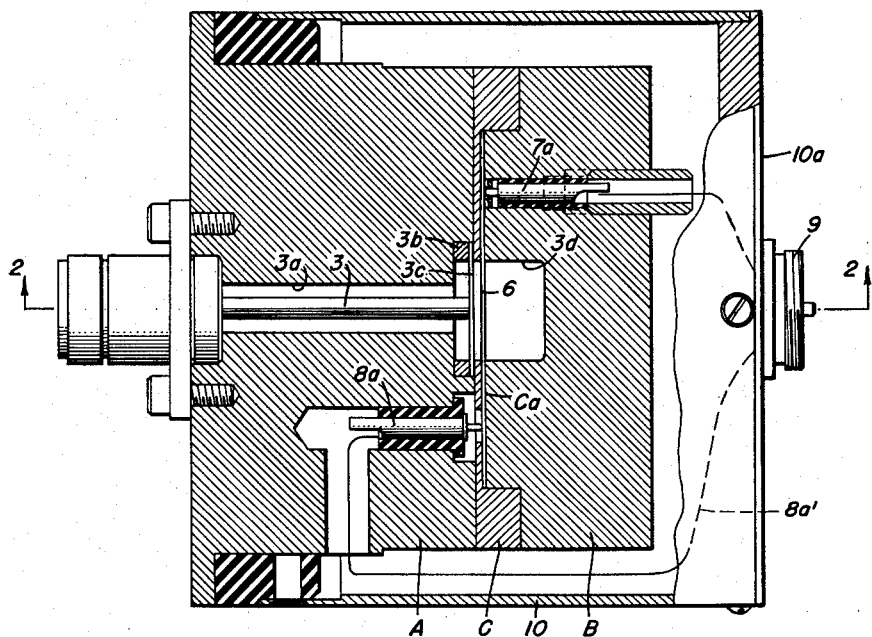

March 12, 1963 S. HOPFER 3,081,430
MICROWAVE POWER METER OF THE CALORIMETER TYPE
Filed June 6, 1960 4 Sheets-Sheet 1

INVENTOR
SAMUEL HOPFER
BY Kenyon, Palmer & Stewart
ATTORNEYS

March 12, 1963  S. HOPFER  3,081,430
MICROWAVE POWER METER OF THE CALORIMETER TYPE
Filed June 6, 1960  4 Sheets-Sheet 2

INVENTOR
SAMUEL HOPFER
BY Kenyon, Palmer + Stewart
ATTORNEYS

March 12, 1963  S. HOPFER  3,081,430
MICROWAVE POWER METER OF THE CALORIMETER TYPE
Filed June 6, 1960  4 Sheets-Sheet 3

INVENTOR
SAMUEL HOPFER
BY Kenon, Palmer & Stewart
ATTORNEYS

March 12, 1963 S. HOPFER 3,081,430
MICROWAVE POWER METER OF THE CALORIMETER TYPE
Filed June 6, 1960 4 Sheets-Sheet 4

INVENTOR
SAMUEL HOPFER
BY Kenyon, Palmer + Stewart
ATTORNEYS

United States Patent Office 3,081,430
Patented Mar. 12, 1963

3,081,430
MICROWAVE POWER METER OF THE CALORIMETER TYPE
Samuel Hopfer, Brooklyn, N.Y., assignor to PRD Electronics, Inc., Brooklyn, N.Y., a corporation of New York
Filed June 6, 1960, Ser. No. 34,300
6 Claims. (Cl. 324—95)

This invention relates to power meters for the measurement of energy of electric waves within the microwave range. It is concerned especially with power meters of the calorimeter type where the wave energy is converted into heat and the effect of the heat is utilized to provide an indication of the amount of power present.

Broadly, applicant's power meter is of the same general type as that disclosed in U.S. Patent 2,398,606 to Wang, in which two transmission line sections are maintained under the same environmental conditions, the microwave energy to be measured being fed into one transmission line section, while the other section serves as a "dummy" section which may respond only to ambient conditions, or which may receive direct-current power to counterbalance the effect of the wave energy in the active line section. Each line section includes a thermocouple which responds to the temperature of the parts which are affected by heat from the microwave energy and by heat from the atmosphere or heat from the D.C. current. These thermocouple elements are connected in an indicator circuit to produce an indication which is proportional to the resultant between the two effects.

The present invention is an improvement in the power meter described in PRD Reports, vol. 5, No. 1, for April–October 1956, published by Polytechnic Research and Development Co., Inc.

Where the microwave energy in the active line is absorbed in a load which possesses considerable thermal inertia, a time lag is introduced in the meter indication which makes it impossible to obtain an accurate indication of the amount of power being measured except after an undesirably long time delay.

The primary object of the present invention is to devise a power meter in which the amount of delay is reduced to a minimum and the power indication reaches its true value in a very short time.

The object of the present invention is attained by providing a load which has a very low thermal inertia, and by transferring heat from the load to the thermocouple elements through a medium of very low thermal inertia and by radiation. In the preferred form of the invention the load is in the form of a very thin metal film and heat is transferred from the load to the thermocouple elements by way of air or other gaseous medium within the enclosed space occupied by the load and the thermocouple elements and by radiation, such elements being physically separate from the load.

The two load elements are identical and are mounted in identically formed cavities within a common heat sink formed of metal of good conductivity. Each load is connected to the heat sink so that the heat generated in the load is transmitted to the sink principally by conduction and partly by convection. For broad-band operation, the resistive load is distributed over as large an area as possible and should be very thin. The thermopile is formed of a number of hot junctions spaced over different areas of the active load and of a number of cold junctions spaced over different areas of the dummy load, so that the hot junctions respond to the average temperature of the air within the cavity of the active load and the cold junctions respond to the average temperature of the air within the cavity of the dummy load.

The time lag is also reduced by the use of a thermopile structure of very low thermal inertia, the couples being formed of very thin conductor strips deposited on thin sheets of insulating material. No heat-absorbing masses are connected to either set of junctions which would function as heat sinks.

Figure 2:
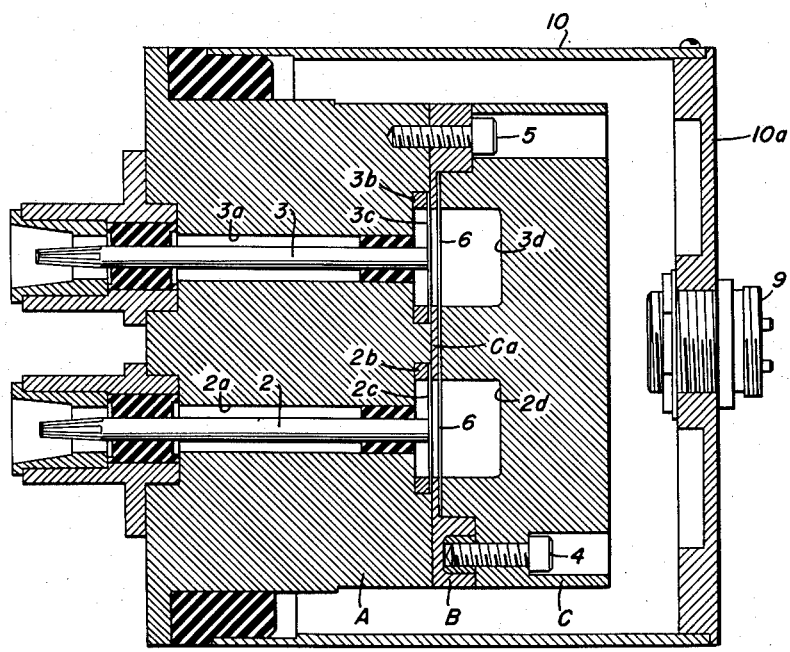
Figure 3:
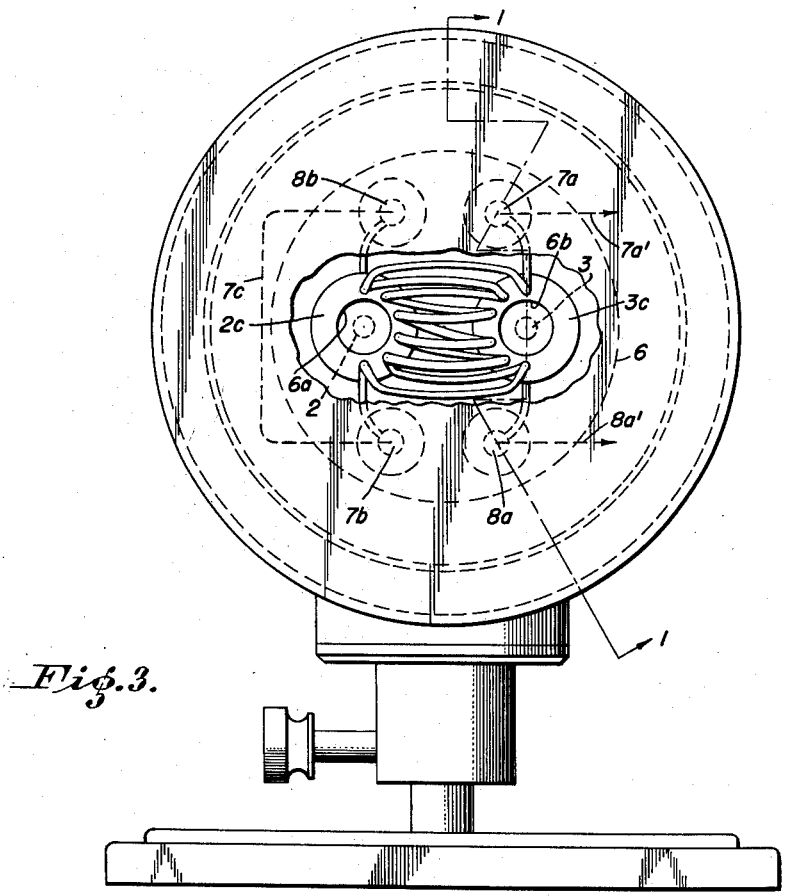

Suitable embodiments of the invention are illustrated in the accompanying drawing in which FIGURES 1 to 3 show one form of the invention where the two transmission line sections are in the form of coaxial line sections, and FIGURES 4 to 7 show another embodiment where the two transmission line sections are in the form of rectangular wave guides.

FIGURE 1 is a sectional view of the meter structure taken along the cutting plane 1—1 of FIGURE 3;
FIGURE 2 is a sectional view of FIGURE 1 taken along the cutting plane 2—2; and
FIGURE 3 is a rear elevational view of the meter with portions of the rear cover and the rear body section removed to show the thermopile.

The power meter of FIGURES 1 to 3 is formed of a body of metal of good conductivity (such as brass or copper) having a front portion A, a rear portion B and a middle portion C. Section C is clamped to section B by a set of screws 4 spaced about the periphery of the body, and this assembly is clamped to section A by a set of screws 5 also spaced about the periphery of the body. The two line sections of the meter are formed of conductors 2 and 3 mounted within parallel bores 2a and 3a formed in the front block section A, conductors 2 and 3 being provided with conventional coupling connectors at their outer ends. Section A is counterbored at its inner face to provide cavities for receiving two rings 2b and 3b which form supports for circular discs 2c and 3c formed of resistive material and which constitute the load elements for the two line sections. Conductors 2 and 3 are connected to the centers of discs 2c and 3c and these discs are connected at their outer peripheries to section A through the rings 2b and 3b. The middle section C of the body is formed of a thickened rim portion and a thin central portion Ca clamped between the sections A and B. The thin portion Ca has two holes formed therein opposite the rings 2b and 3b and the rear section B is counterbored at 2d and 3d in alignment with the holes in the thin section Ca. It will be seen that the inner surfaces of the rings 2b and 3b, the inner surfaces of the holes in the thin section Ca and the inner surfaces of the counterbores 2d and 3d form separate cavities within the body sections A, C, and B for housing the load elements 2c and 3c. These resistive load elements may be formed by depositing a thin metallic film on one face of discs of thin insulating sheet material, such as mica, the outer edge portion of the film on each disc being clamped between sections A and C of the body.

The thermopile of the meter is formed on a disc 6 of insulating material, such as mica, of a diameter slightly smaller than the ring portion of the section C and is clamped within the ring portion between section C and section B. As shown in FIGURE 3, the insulating disc 6 is provided with round holes 6a and 6b which are formed opposite the centers of the load discs 2c and 3c to allow free passage of air from one side of the disc 6 to the other. These holes are of smaller diameter than the load cavities 2d and 3d. The thermopile is formed in two sections on opposite faces of the mica disc 6, one section being on the rear face of the disc as shown in FIGURE 3, the other section being constructed in identical form on the front face of the mica disc. As shown in FIGURE 3, the thermopile is formed of thin strips of metal intimately bonded to the face of the disc 6, one end of each strip being located in one load cavity and the other end being located in the opposite load cavity. Adjacent strips are formed of unlike metal. For example, the odd numbered strips may be formed of bismuth while the even numbered strips are formed of antimony. The strips are connected together at their ends in zig-zag formation so that each junction is formed between two unlike metals, the junctions being arranged concentric with the holes $6a$ and $6b$ and spaced from the cylindrical walls of cavities $2d$ and $3d$.

FIGURE 3 shows the section of the thermopile formed on the rear face of disc 6, this section being connected between terminals $7a$ and $7b$. An identically formed thermopile section is mounted on the front face of disc 6 and is connected between the terminals $8a$ and $8b$, and the two thermopile sections are connected in series by a connection $7c$ extending between the terminals $7b$ and $8b$. The terminals $7a$ and $8a$ are connected by leads $7a^1$ and $8a^1$ to the output line coupling 9 mounted on the rear cover of the meter. Terminals $7a$, $7b$, $8a$ and $8b$ are spring pressed contacts of known construction of the type shown for terminals $7a$ and $8a$ in FIGURE 1, contacts $8a$ and $8b$ being mounted in recesses in the front body section A and having contact with terminal strips arranged on the front face of the disc 6, while contacts $7a$ and $7b$ are mounted within recesses formed in the rear body section B and engage terminal strips secured to the rear face of the disc 6.

The thermopile sections may be formed by cutting narrow strips of metal from thin sheets and bonding the strips in any suitable manner to the face of the disc 6 with the ends of adjacent strips overlapping in the manner shown in FIGURE 3, or all the strips of one metal may be formed at one time by any suitable process of forming printed circuits, then the strips of opposite metal will be formed in another operation to overlap the ends of the first formed strips.

It will be understood that after the thermocouple strips have been applied to the two faces of disc 6, both sections of the thermocouple are covered with a coating of insulating material, except for the terminal strip portions engaged by the contacts $7a$, $7b$, $8a$ and $8b$. The insulating layers prevent short-circuiting of the thermopile sections by the body portions C and B where the thermopile strips pass from one cavity to the other.

The body of the power meter may be enclosed within a casing 10 spaced from the cylindrical walls of the body in order to prevent the body from coming in contact with objects which might absorb heat from the body in an unsymmetrical manner. The casing 10 is closed at the rear end by a cover plate $10a$ which carries the output line coupling 9.

Wave energy to be measured is supplied through line 2 to the load disc $2c$ where it is converted into heat energy within the cavity $2d$. This heat energy is eventually absorbed by the metallic body, principally by conduction and partly by convection within the cavity. The thermocouple junctions carried by the disc 6 within the cavity $2d$ are located close to the load disc $2c$ and receive heat from the disc both by direct radiation and by convection. These junctions are distributed about the cavity $2d$ and respond to the average temperature of the air within the cavity. Where the meter is used in a substitution method of measurement, direct current is supplied through line 3 to the load disc $3c$ to heat up this disc to the point where the thermocouples within the cavity $3d$ counterbalance the effect of the thermocouples in the cavity $2d$, then measurement of the D.C. power provides an indication of the wave energy supplied by line 2.

Since the load elements are very thin resistive films without substantial heat inertia, and since the air within cavities $2d$ and $3d$ responds quickly to changes in temperature of the load elements, the meter has a very rapid response to power supplied through the active line 2. The fact that the thermocouple junctions are formed of very thin metal strips of low heat inertia aids in securing rapid response.

The power meter illustrated in FIGURES 4 to 7 is designed for use in the measurement of power transmitted through a wave guide. In this case also the metallic body of the meter is formed of solid blocks of metal clamped together and containing two rectangular slots formed in parallel relation and constituting the load cavities for the active and dummy loads.

Figure 4:
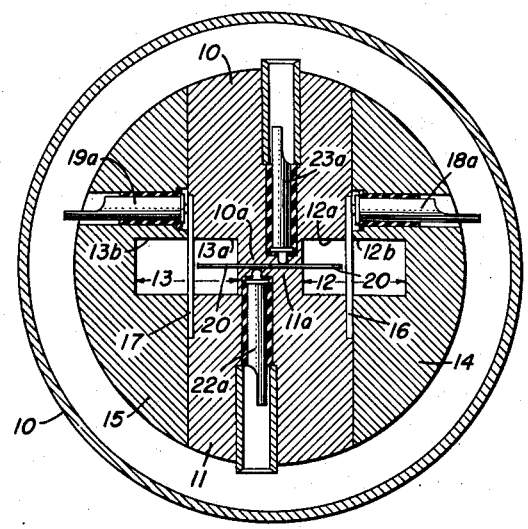
Figure 5:
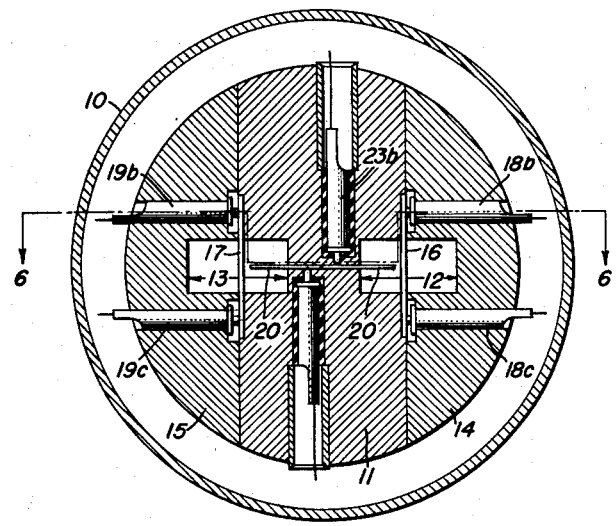
Figure 7:
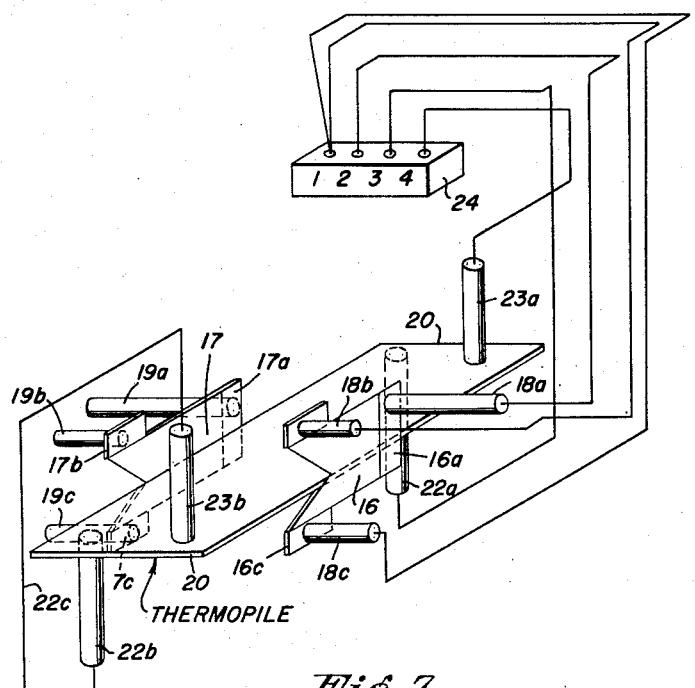
Figure 6:
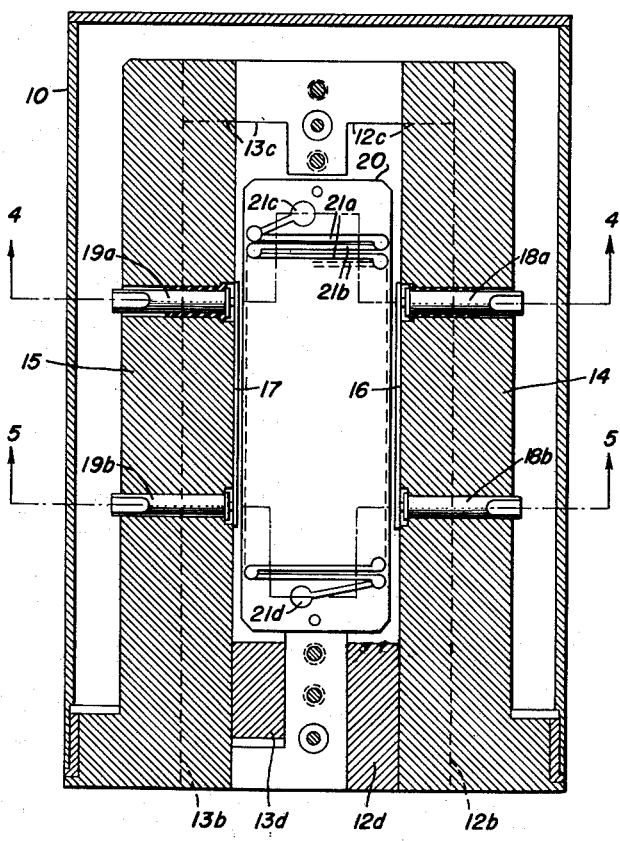

FIGURE 4 is a sectional view of FIGURE 6 taken along the cutting plane 4—4; FIGURE 5 is a sectional view of FIGURE 6 taken along the cutting plane 5—5; FIGURE 6 is a sectional view of FIGURE 5 taken along the cutting plane 6—6; and FIGURE 7 is a circuit diagram showing the arrangement of the two load elements and the thermopile, and their electrical connections.

As shown in FIGURES 4 and 5 the central portion of the body is formed of two blocks 10 and 11 which are clamped together by suitable screws not shown. These blocks extend throughout the length of the body and a slot $12a$ is formed in one side of the central portion, the slot being of substantially square cross-section and being divided equally between the blocks 10 and 11. A similar slot $13a$ is formed on the opposite face of the central section, both slots extending throughout the length of the body and being separated by web portions $10a$ and $11a$ of blocks 10 and 11. The two outer sections of the body are formed of blocks 14 and 15 clamped to opposite faces of the middle section, and these blocks are provided with rectangular slots $12b$ and $13b$ which are positioned immediately opposite the slots $12a$ and $13a$ respectively. Slots $12a$ and $12b$ together form one wave guide load cavity 12 while slots $13a$ and $13b$ form another wave guide load cavity 13.

The faces of blocks 10 and 11 adjacent the slot $12a$ are recessed to provide narrow gaps between these blocks and the block 14 in which a load element 16 is mounted. Likewise, the faces of blocks 10 and 11 adjacent the slot $13a$ are recessed to provide a narrow gap between these blocks and block 15 for the mounting of a load element 17. Since load elements 16 and 17 are quite thin, they have been shown in elevation in FIGURES 4 and 5. They are formed of very thin strips of mica or other suitable insulation having a thin metallic coating on one face thereof in the form represented in FIGURE 7 where the front end of the load strip is notched with a V-shaped notch to reduce reflection of waves in the wave guide. As shown in FIGURES 4 and 5, the load strips extend above and below the wave guide cavities 12 and 13, and are insulated from electrical contact with the body portions by a thin coating of suitable insulation, such as silicon monoxide or quartz. The load strips are provided with low-resistance terminal portions $16a$ and $17a$ respectively and located at the rear end of the strips, and two further low-resistance terminal tabs are connected to opposite edges of each load strip at the front end, as shown at $16b$, $16c$ and $17b$ and $17c$, respectively. Spring-pressed contacts $18a$, $18b$ and $18c$ are mounted in cavities formed in block 14 in proper positions to make contact with the terminal portions $16a$, $16b$ and $16c$, respectively. Likewise, spring-pressed contacts $19a$, $19b$ and $19c$ are mounted in recesses formed in block 15 in positions to engage terminal portions $17a$, $17b$ and $17c$, respectively. While the load elements 16 and 17 are insulated electrically from the body of the meter, they have very good thermal contact with the body along their upper and lower edge portions which are clamped between the side blocks 14 and 15 and the central blocks 10 and 11 respectively.

The thermopile of FIGURES 4 to 6 is formed on a thin sheet of mica 20 or other insulation material and is mounted in a narrow gap formed between the web portions $10a$ and $11a$ of blocks 10 and 11, so that the long edges of the strip 20 are parallel with and closely spaced from the middle portions of the load strips 16 and 17, as shown in FIGURES 4 to 6. In this case also, the thermocouples are formed in two groups on opposite faces of the sheet 20, and in the same manner as indicated above for the thermopile construction of FIGURES 1 to 3. One section of the thermopile as formed on the lower face of sheet 20 is illustrated in FIGURE 6 where strips of one metal are represented at 21a and alternate strips of a different metal shown at 21b, adjacent strips being joined together at their ends to form two rows of junctions located along opposite edges of the mica strip 20. One end of the thermopile section is provided with a terminal strip 21c and the other end with a terminal strip 21d located in positions to be engaged by spring-pressed contacts 22a and 22b, respectively, mounted in bores formed in block 11. Another section of the thermopile formed identically with that described is carried by the upper face of sheet 20 and is provided with terminal portions located in positions to be engaged by another pair of spring-pressed contacts 23a and 23b, respectively, mounted in bores formed in the block 10.

The rear ends of load cavities 12 and 13 are suitably shorted at 12c and 13c and polyfoam plugs 12d and 13d close the front ends to prevent entry of outside air, and the front end of 12 is connected to the source of wave energy to be measured.

FIGURE 7 shows the electrical connections for the thermopile and for one load element. The two sections of the thermopile located on opposite faces of the strip 20 are connected in series by the connection 22c between contacts 22b and 23b, and the ends of the thermopile are connected to separate terminals 3 and 4 on terminal block 24 by connections from contacts 22a and 23a respectively. The contact 18 at the rear end of the load element is connected to terminal 2, and the two front contacts engaging terminal portions 16b and 16c are both connected to a common terminal 1 on the terminal block 24. If desired or necessary, similar connections may be provided for the load element 17. By applying direct current between terminals 1 and 2 on block 24, the dummy load will be heated with a distribution of heat substantially like that of the active load.

In the co-axial line meter of FIGURES 1 to 3, the load discs should be of such diameter and thickness that the direct current resistance is equal to the characteristic impedance of the supply line. The resistance of the load disc will be of the order of 300 ohms per square.

In the case of the waveguide meter of FIGURES 4 to 7, the resistive films forming the load elements will have a resistance value to secure a good match with the waveguide with a short length of load strip. The resistance of the load strip will be of the order of 170 ohms per square.

I claim:

1. An electric wave energy meter comprising a metallic body of good conductivity and forming a heat-sink, said body having two cavities formed therein of the same size and shape and enclosing a gaseous medium, a load element mounted in each cavity each comprising a thin metallic film of low heat inertia, a thermopile having two sets of junctions mounted respectively within said two cavities and thermally coupled to the load elements therein through said gaseous medium, two transmission lines of substantially identical construction embodied in said body and connected respectively to said load elements, and means adapting one of said lines for supplying electric wave energy to one of said load elements.

2. A meter according to claim 1 wherein the two cavities in said body are cylindrical in shape and said load elements are of circular disc form having their peripheral edge portions connected both electrically and thermally to said body, and said two transmission lines are co-axial lines comprising two bores formed in said body coaxially with said cavities and connected with said cavities and center conductors mounted in said bores and connected respectively to the centers of the two load discs.

3. A meter according to claim 1 wherein said transmission lines comprise rectangular wave guides formed of parallel slots in said body of rectangular form, portions of said slots forming said load cavities, said load elements comprising thin metallic films mounted within said load cavities along the middle planes thereof and with their planes parallel with the electric fields within said cavities.

4. A meter according to claim 3 wherein a narrow slot is formed through the mid-portion of the web part of the body which separates the two cavities, and said thermopile is mounted in said narrow slot with the two sets of thermocouple junctions extending in opposite directions from said web part and being positioned in two rows arranged closely adjacent the mid-portions of said metallic film load elements.

5. A meter according to claim 4 wherein said metallic body is formed of three separable sections, a mid section and two side sections, divided along separating planes passing through the mid planes of said rectangular slots, said load elements being clamped between said middle section and said side sections, respectively.

6. A meter according to claim 2 wherein said metallic body is formed of three separable linear sections, a front section, a middle section, and a rear section, said two load cavities being formed mainly in said rear section and extending forward through said middle section and into a portion of said front section, said load elements being clamped between said front section and said middle section, and said thermopile being formed upon a sheet of insulating material which is clamped between said rear section and said middle section and having portions thereof carrying said junctions located within said load cavities.

References Cited in the file of this patent

UNITED STATES PATENTS

| | | |
|---|---|---|
| 2,602,828 | Norton | July 8, 1952 |
| 2,832,045 | Sharpless | Apr. 22, 1958 |